United States Patent
Kim et al.

(10) Patent No.: US 10,625,642 B2
(45) Date of Patent: Apr. 21, 2020

(54) VENTILATION SEAT OF VEHICLE

(71) Applicant: Hyundai Dymos Incorporated, Seosan, Chungcheongnam (KR)

(72) Inventors: Do Hyung Kim, Gyeonggi-do (KR); Ho Sub Lim, Seoul (KR)

(73) Assignee: Hyundai Dymos Incorporated, Seosan, Chungcheongnam-Do (KR)

( * ) Notice: Subject to any disclaimer, the term of this patent is extended or adjusted under 35 U.S.C. 154(b) by 0 days.

(21) Appl. No.: 16/149,616

(22) Filed: Oct. 2, 2018

(65) Prior Publication Data

US 2019/0118683 A1 Apr. 25, 2019

(30) Foreign Application Priority Data

Oct. 20, 2017 (KR) .......................... 10-2017-0136552

(51) Int. Cl.
- *B60N 2/56* (2006.01)
- *B60N 2/58* (2006.01)

(52) U.S. Cl.
CPC ......... *B60N 2/5642* (2013.01); *B60N 2/5621* (2013.01); *B60N 2/5875* (2013.01)

(58) Field of Classification Search
CPC ... B60N 2/5642; B60N 2/5875; B60N 2/5621
See application file for complete search history.

(56) References Cited

U.S. PATENT DOCUMENTS

| | | | | |
|---|---|---|---|---|
| 2005/0264086 A1* | 12/2005 | Lofy | .................... | B60N 2/5628 297/452.42 |
| 2017/0341551 A1* | 11/2017 | Benthaus | ............... | B60N 2/976 |
| 2018/0361893 A1* | 12/2018 | Iacovone | ................ | B60N 2/50 |

FOREIGN PATENT DOCUMENTS

| JP | H1191456 A | 4/1999 |
|---|---|---|
| JP | 2008-279995 A | 11/2008 |
| JP | 2008279995 A * | 11/2008 |
| JP | 2010-100173 A | 5/2010 |

OTHER PUBLICATIONS

Saito, JP 2008279995 A, Nov. 2008, Espacenet, machine translation (Year: 2008).*

* cited by examiner

*Primary Examiner* — David R Dunn
*Assistant Examiner* — Tania Abraham
(74) *Attorney, Agent, or Firm* — Mintz Levin Cohn Ferris Glovsky and Popeo, P.C.; Peter F. Corless

(57) ABSTRACT

Disclosed herein is a ventilation seat of a vehicle, wherein since an adhesive material includes a through hole corresponding to an air flow path of a seat pad, when the seat pad and the adhesive material are joined to each other, an area disjoined between the seat pad and the adhesive material is prevented from occurring. Accordingly, noise caused by a gap that may occur between the seat pad and the adhesive material is prevented, which eliminates discomfort and displeasure due to the noise when a driver is seated in the seat and improves marketability of the ventilation seat.

8 Claims, 6 Drawing Sheets

VENTILATION SEAT OF VEHICLE

CROSS REFERENCE TO RELATED APPLICATION

The present application claims priority to Korean Patent Application No. 10-2017-0136552, filed Oct. 20, 2017, the entire contents of which is incorporated herein for all purposes by this reference.

BACKGROUND OF THE INVENTION

Field of the Invention

The present invention generally relates to a ventilation seat of a vehicle, wherein the ventilation seat prevents noise occurring at an area on which when joining a channel cover to a seat pad, the channel cover is not joined to the seat pad.

Description of the Related Art

Generally, a vehicle is provided with a seat on which a driver is seated, wherein the seat includes a seat back which supports the back and waist part of the driver and a seat cushion on which the driver sits. When a driver sits for a long time in the seat, sweat from the driver's buttocks, back, and a lower back accumulates, which makes sitting in the seat unpleasant.

Accordingly, a seat includes a ventilation device provided therein, the ventilation device sending air to a driver sitting in the seat by blowing the air through ventilation channels provided in the seat back and the seat cushion. Accordingly, air is supplied to a portion of the driver in contact with the seat back and the seat cushion, whereby cooling functions are realized, thus making riding pleasant.

Here, a cushion part of each of the seat back and the seat cushion includes the ventilation channel and an additional cover such that the air of the ventilation channel does not leak out. The cover is joined by an adhesive material to the cushion part, and when a gap occurs between the cushion part and the adhesive material, the adhesive material is repeatedly joined to and disjoined from the cushion part on the associated area, which creates noise.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a ventilation seat of a vehicle, wherein the ventilation seat prevents a disjoined area that may occur between a cushion part and an adhesive material, thereby preventing noise caused by a gap that may occur between the cushion part and the adhesive material.

In order to achieve the above object, according to the present invention, there is provided a ventilation seat of a vehicle, the ventilation seat including: a seat pad having an air flow path provided on a lower surface part of the seat pad by being depressed on the lower surface part, with air flowing in the air flow path; a channel cover provided to have a plate shape and to be in close contact with the lower surface part of the seat pad in order to cover the air flow path; and an adhesive material arranged between the seat pad and the channel cover, and joined to the lower surface part of the seat pad and an upper surface part of the channel cover respectively, wherein the adhesive material has a through hole provided on an area corresponding to an area of the air flow path.

The air flow path of the seat pad may be configured to extend in a plurality of courses on the lower surface part of the seat pad, and the through hole of the adhesive material may be configured by extending in order to correspond to a shape of the air flow path.

A width of the through hole may be configured to be the same as a width of the air flow path.

When an inlet part depressed at a position at which the air flow path is provided on the lower surface part of the seat pad is configured to be curved, and thus a width of opposite lower ends of the inlet part is configured to be larger than a width of an inside of the air flow path, a width of the through hole may be configured to be larger than the width of the opposite lower ends of the inlet part.

The inlet part depressed at a position at which the air flow path is provided on the lower surface part of the seat pad may include joined parts protruding from opposite lower ends of the air flow path toward a center of the air flow path, and a width of the through hole may be configured to be equal to or larger than the distance spaced apart from each other between the opposite lower ends of the joined parts.

Each of the joined parts may be configured to constitute the same surface as the lower surface part of the seat pad.

The adhesive material may be an acrylic pressure sensitive adhesive (PSA), a rubber PSA, or a hot melt PSA.

The ventilation seat of a vehicle having a configuration mentioned above is configured in such a manner that when the seat pad and the adhesive material are joined to each other, the adhesive material includes the through hole corresponding to the air flow path of the seat pad, thereby preventing an area disjoined between the seat pad and the adhesive material from occurring. Accordingly, noise caused by a gap that may occur between the seat pad and the adhesive material is prevented, which eliminates discomfort and displeasure due to the noise when a driver is seated in the seat and improves marketability of the ventilation seat.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a ventilation seat of a vehicle according to exemplary embodiments of the present invention will be described in detail with reference to the accompanying drawings.

Figure 1:
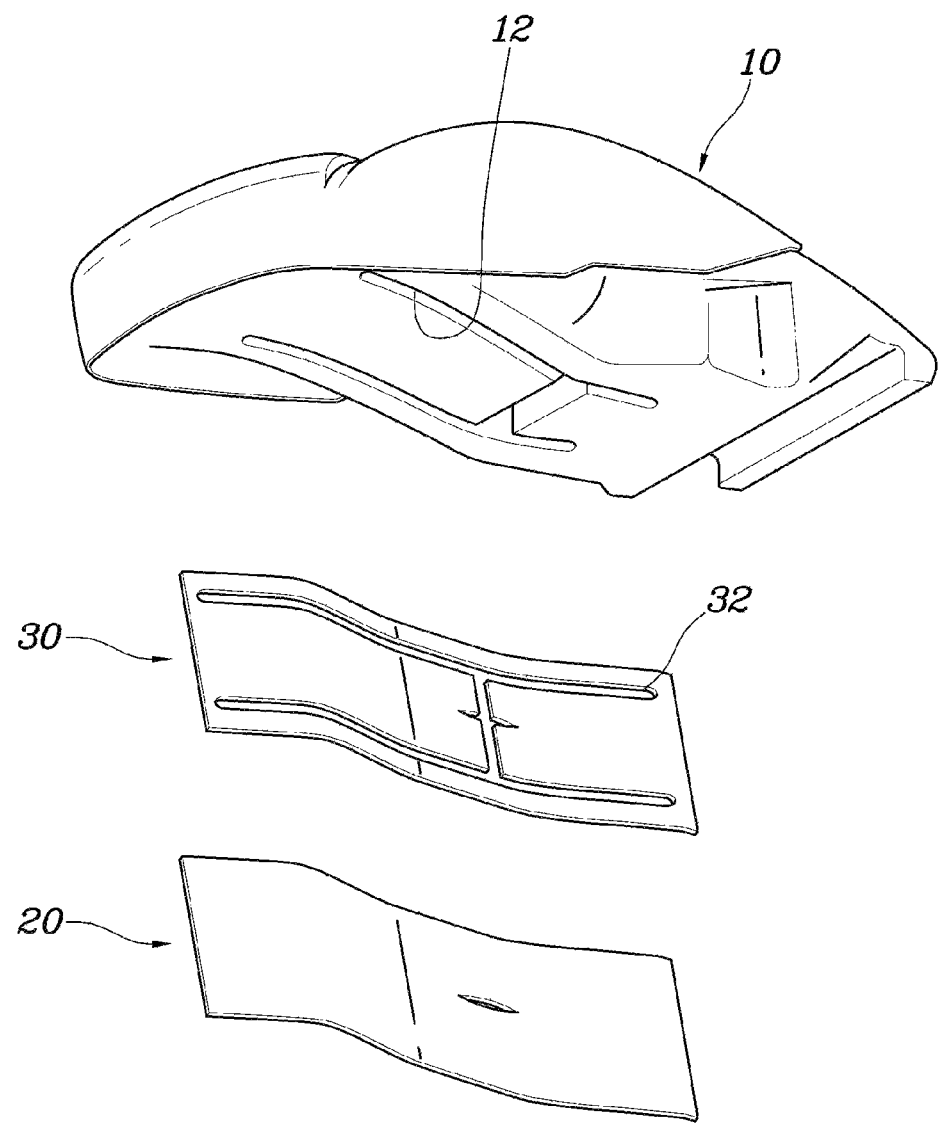
FIG. 1 is an exploded perspective view showing a ventilation seat of a vehicle according to a first embodiment of the present invention.
Figure 2:
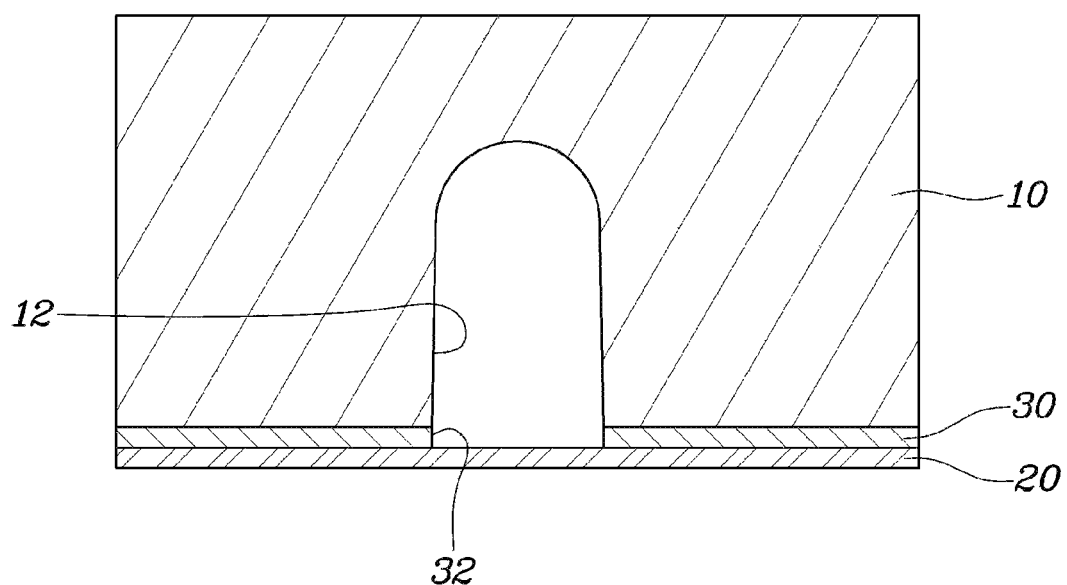
FIG. 2 is a cross-sectional view for describing the first embodiment of the ventilation seat shown in FIG. 1.
Figure 3:
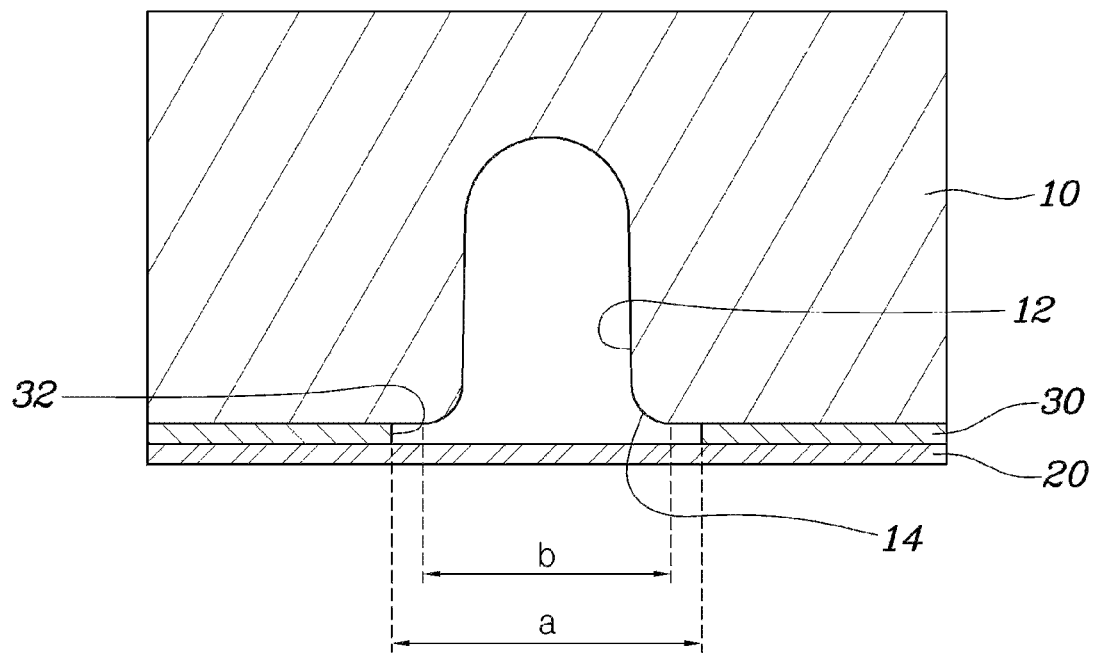
FIG. 3 is a cross-sectional view for describing a second embodiment of the ventilation seat shown in FIG. 1.
Figure 4:
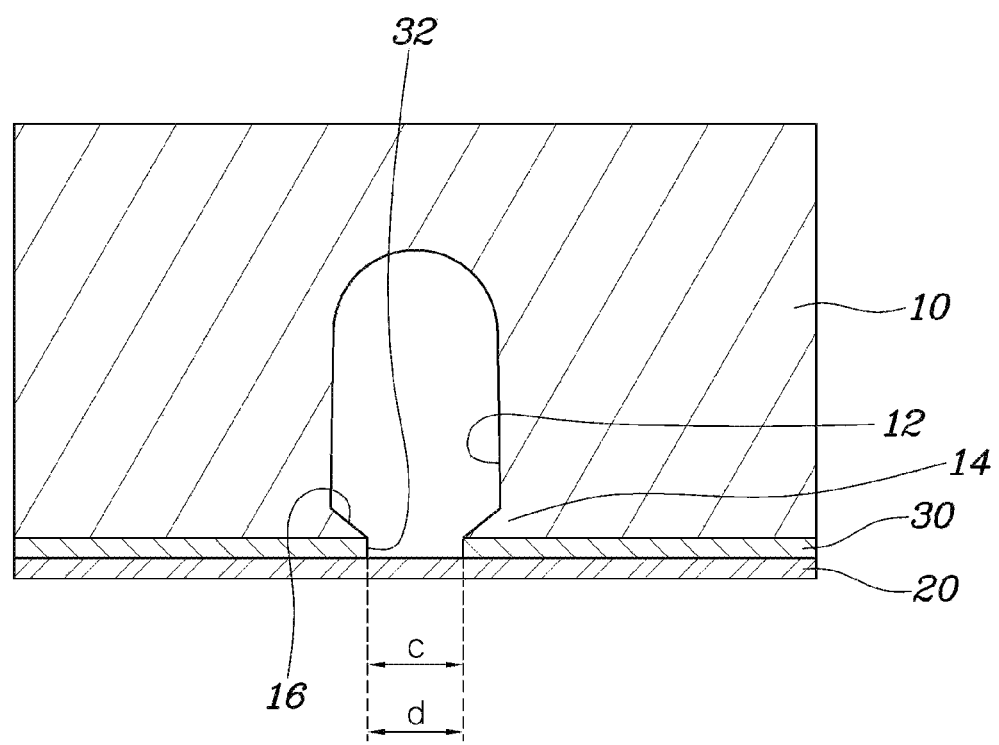
FIG. 4 is a cross-sectional view for describing a third embodiment of the ventilation seat shown in FIG. 1.

FIG. 1 is an exploded perspective view showing the ventilation seat of a vehicle according to a first embodiment of the present invention, FIG. 2 is a cross-sectional view for describing the first embodiment of the ventilation seat shown in FIG. 1, FIG. 3 is a cross-sectional view for describing a second embodiment of the ventilation seat shown in FIG. 1, and FIG. 4 is a cross-sectional view for describing a third embodiment of the ventilation seat shown in FIG. 1.

The ventilation seat of a vehicle according to the present invention is configured in such a manner that the ventilation seat is provided with a seat pad 10 having an air flow path 12, and while with a channel cover 20 joined to the seat pad 10, air is flowing in the air flow path 12, the air does not leak out to the outside. Here, the seat pad 10 has a blower unit provided on a lower side thereof, wherein the blower unit is connected to the seat pad by passing through the channel cover 20 in order to communicate with the air flow path 12, and accordingly the blower unit supplies ventilation air to the air flow path 12. The conventional configuration of the ventilation seat including an air hole through which the air flow path 12 communicates with a position of a driver, and a mount hole through which the blower unit passes through the channel cover 20 is not shown in the drawings and is not described in detail, but in describing the present invention, an adhesive material 30 joining the seat pad 10 to the channel cover 20 will be described in detail.

As shown in FIG. 1, the ventilation seat of a vehicle according to the present invention includes the seat pad 10 having the air flow path 12 provided on a lower surface part of the seat pad by being depressed on the lower surface part, with air flowing in the air flow path 12; the channel cover 20 provided to have a plate shape and to be in close contact with the lower surface part of the seat pad 10 in order to cover the air flow path 12; and the adhesive material 30 arranged between the seat pad 10 and the channel cover 20, and joined to the lower surface part of the seat pad 10 and an upper surface part of the channel cover 20 respectively, wherein the adhesive material has a through hole 32 provided on an area corresponding to an area of the air flow path 12.

Here, the seat pad 10 is applied to a seat cushion or a seat back, and when applied to the seat cushion, the seat pad 10 may include the air flow path 12 provided on the lower surface part thereof, and when applied to the seat back, the lower surface part of the seat pad 10 becomes a rear surface part of the seat pad 10, and thus the rear surface part may include the air flow path 12 provided thereon.

Accordingly, the seat pad 10 includes the air flow path 12, and the channel cover 20 is configured to be in close contact with the lower surface part of the seat pad 10. Particularly, the adhesive material 30 is arranged between the seat pad 10 and the channel cover 20, and the seat pad 10 is joined by the adhesive material 30 to the channel cover 20. That is, the lower surface part of the seat pad 10 is joined to an upper surface part of the adhesive material 30, and the upper surface part of the channel cover 20 is joined to a lower surface part of the adhesive material 30, and accordingly the seat pad 10 is joined to the channel cover 20 with the adhesive material 30 arranged therebetween.

Particularly, with the adhesive material 30 arranged between the seat pad 10 and the channel cover 20, the adhesive material 30 has the through hole 32 provided on the area corresponding to the area of the air flow path 12, and may be an acrylic pressure sensitive adhesive (PSA), a rubber PSA, or a hot melt PSA.

Accordingly, though a driver is seated, the air flow path 12 of the seat pad 10 is not joined to the through hole 32 of the adhesive material 30, thus the seat pad 10's repeated joining to and disjoining from the adhesive material 30 is avoided in the vicinity on which the air flow path 12 is provided, whereby noise is prevented.

Figure 6:
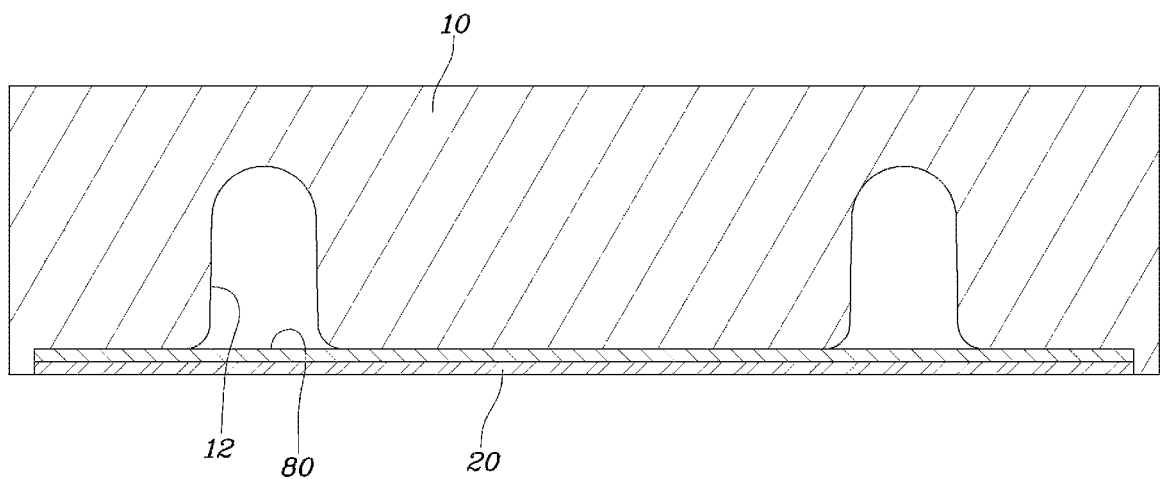
FIG. 6 is a cross-sectional view for describing a conventional ventilation seat of a vehicle.

In addition, when the air flow path 12 is provided on the seat pad 10, due to manufacturing characteristic, the air flow path 12 may include curved inclinations provided on opposite lower ends thereof. Accordingly, as shown in FIG. 6, a disjoined area on which the seat pad 10 and the adhesive material 80 are not joined to each other is created, and when the conventional adhesive material 80 is still applied, the disjoined area allows the seat pad 10 repeatedly to be joined to and disjoined from the adhesive material 80 depending on how a driver is seated, accordingly generating noise.

The present invention is intended to solve the above problems occurring in the related art, and the adhesive material 30 includes the through hole 32 provided on the area corresponding to the area of the air flow path 12. Accordingly, the disjoined area is prevented from occurring, and thereby noise due to the seat pad 10 being joined to and disjoined from the adhesive material 30 is prevented.

Additionally, as shown in FIG. 1, the air flow path 12 of the seat pad 10 may be configured to extend in a plurality of courses on the lower surface part of the seat pad, and the through hole 32 of the adhesive material 30 may be configured by extending in order to correspond to a shape of the air flow path 12.

The air flow path 12 of the seat pad 10 may be configured to extend in the plurality of courses in order to correspond to the sitting posture of a driver, and may be configured to have an 'H' shape as shown in FIG. 1 according to the first embodiment. Here, the through hole 32 of the adhesive material 30 is configured by extending in order to correspond to the shape of the air flow path 12, and the contact of the seat pad 10 with the adhesive material 30 is avoided in the vicinity on which the air flow path 12 of the seat pad 10 is provided, which accordingly prevents noise due to the seat pad 10 being joined to and disjoined from the adhesive material 30.

Meanwhile, according to the first embodiment, a width of the through hole 32 may be configured to be the same as a width of the air flow path 12.

As shown in FIG. 2, since the width of the through hole 32 of the adhesive material 30 is configured to be the same as the width of the air flow path 12 of the seat pad 10, the air flow path 12 and the through hole 32 may be connected to each other in order to extend in a straight line. When the width of the through hole 32 of the adhesive material 30 is configured to be larger or smaller than the width of the air flow path 12 of the seat pad 10, while pressure due to a driver sitting on the seat is applied to the seat pad 10, the seat pad 10 is deformed, and thus the seat pad 10 and the adhesive material 30 may come into contact with each other. Accordingly, during the restoration of the seat pad 10, the separation of the seat pad 10 from the adhesive material 30 may create noise.

Accordingly, since the through hole 32 of the adhesive material 30 and the air flow path 12 of the seat pad 10 are configured to be the same in widths, though the seat pad 10 is deformed, the contact of the seat pad 10 with the adhesive material 30 is avoided on an area on which the through hole 32 is provided while the state of the seat pad 10 being joined to the adhesive material 30 is maintained, and thereby noise is prevented.

Meanwhile, according to the second embodiment of the present invention, as shown in FIG. 3, when an inlet part 14 depressed at a position at which an air flow path 12 is provided on a lower surface part of a seat pad 10 is configured to be curved, and thus a width of opposite lower ends of the inlet part 14 is configured to be larger than a width of an inside of the air flow path 12, a width of a through hole 32 may be configured to be larger than the width b of the opposite lower ends of the inlet part 14.

That is, the seat pad 10 includes the air flow path 12 provided on the lower surface part of the seat pad by being depressed on the lower surface part, and when the inlet part 14 is configured to be curved at a starting position at which the air flow path 12 is depressed, the width a of the through hole 32 is configured to be larger than the width b of the opposite lower ends of the inlet part 14, which enables the seat pad 10 not to be in contact with the adhesive material 30.

Specifically, when pressure due to a driver sitting in the seat is applied to the seat pad 10 with the inlet part 14 of the seat pad 10 being configured to be curved, the seat pad 10 is deformed, and the curved inlet part 14 may momentarily come into contact with the adhesive material 30. Accordingly, when the seat pad 10 is restored, the inlet part 14 of the seat pad 10 is separated from the adhesive material 30, and thus noise may occur.

Accordingly, when the inlet part 14 of the seat pad 10 is configured to be curved, the width a of the through hole 32 provided on the adhesive material 30 is configured to be larger than the width b of the opposite lower ends of the inlet part 14 such that though the seat pad 10 is deformed, the contact of the seat pad 10 with the adhesive material 30 is avoided by the through hole 32 provided while the state of the seat pad 10 being joined to the adhesive material 30 is maintained, thereby preventing noise.

Meanwhile, according to the third embodiment, as shown in FIG. 4, an inlet part 14 depressed at a position at which an air flow path 12 is provided on a lower surface part of a seat pad 10 includes joined parts 16 protruding from opposite lower ends of the air flow path toward a center of the air flow path 12, and a width c of a through hole 32 may be configured to be equal to or larger than a distance d spaced apart from each other between opposite lower ends of the joined parts 16.

Here, each of the joined parts 16 is configured to constitute the same surface as the lower surface part of the seat pad 10 such that the adhesive material 30 is in close contact with the lower surface part of the seat pad 10 and the joined parts 16.

Accordingly, the air flow path 12 of the seat pad 10 includes the joined parts 16, and the width c of the through hole 32 is configured to be equal to or larger than a distance d spaced apart from each other between the opposite lower ends of the joined parts 16 such that though the seat pad 10 is deformed, the seat pad 10 is not joined to and disjoined from the adhesive material 30.

That is, when the seat pad 10 is deformed by a driver sitting in a seat, the joined parts 16 protruding from the opposite lower ends of the air flow path 12 toward an inside thereof and the adhesive material 30 maintain a state joined to each other, and accordingly though the seat pad 10 is deformed, the seat pad 10 being repeatedly joined to and disjoined from the adhesive material 30 is avoided.

Figure 5:
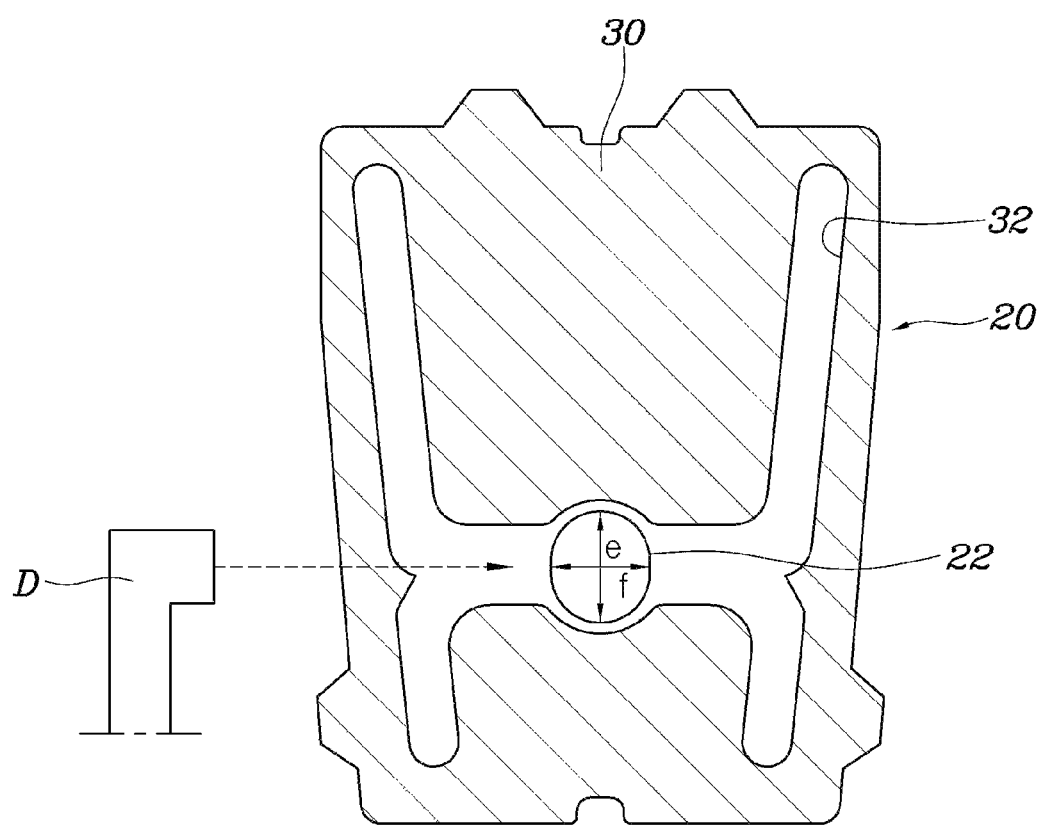
FIG. 5 is a top plan view for describing a fourth embodiment of the ventilation seat shown in FIG. 1.

FIG. 5 is a top plan view for describing a fourth embodiment of the ventilation seat shown in FIG. 1, wherein a channel cover 20 includes a slit hole 22 provided thereon, and an adhesive material 30 is joined to the channel cover 20.

The channel cover 20 is joined by the adhesive material 30 to a lower surface part of a seat pad 10, and a ventilation duct D of the outside, which communicates with an air flow path 12 of the seat pad 10, is required to be combined with the channel cover 20. To this end, the channel cover 20 includes the slit hole 22 provided thereon through which the ventilation duct D passes in order to be combined with the channel cover 20.

The slit hole 22 is provided at a position at which the air flow path 12 and a through hole 32 overlap such that the ventilation duct D of the outside of a seat communicates with the air flow path 12 of an inside of the seat. Further, when the ventilation duct D and the channel cover 20 are combined with each other, assembly tolerances may occur. Accordingly, the slit hole 22 is configured in such a manner that a diameter e of the slit hole in a longitudinal direction of the seat is larger than a diameter f of the slit hole in a width direction of the seat such that the ventilation duct D is safely combined with the slit hole 22 even when the assembly tolerances occur. That is, since the slit hole 22 has a shape of an oval or a slit extending long in a longitudinal direction of a seat, the ventilation duct D may be mounted to the channel cover 20 without being interfered with by the channel cover though the ventilation duct D is mounted to a position slightly deviating forwards or rearwards from the exact position on which the ventilation duct D is mounted to the channel cover 20.

When the slit hole 22 has a shape of an exact circle and assembly tolerances occur, the assembly of the ventilation duct D with the slit hole may be made impossible, or a frictional force occurring between the ventilation duct D and an edge of the slit hole 22 may increase, which may cause noise. According to the present invention, the diameter of the slit hole 22 increases in the longitudinal direction of the seat, and thereby such a problem is prevented from occurring.

The ventilation seat of a vehicle having a configuration mentioned above is configured in such a manner that when the seat pad 10 and the adhesive material 30 are joined to each other, the adhesive material 30 includes the through hole 32 corresponding to the air flow path 12 of the seat pad 10, and thus an area disjoined between the seat pad 10 and the adhesive material 30 is prevented from occurring. Accordingly, noise caused by a gap that may occur between the seat pad 10 and the adhesive material is prevented, which thereby eliminates discomfort and displeasure due to the noise when a driver is seated in the seat and improves marketability of the ventilation seat.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A ventilation seat of a vehicle, the ventilation seat comprising:
    a seat pad having an air flow path provided on a lower surface part of the seat pad by being depressed on the lower surface part, with air flowing in the air flow path;
    a channel cover provided to have a plate shape and to be in close contact with the lower surface part of the seat pad in order to cover the air flow path; and
    an adhesive material arranged between the seat pad and the channel cover, and joined to the lower surface part of the seat pad and an upper surface part of the channel cover respectively, wherein the adhesive material has a through hole provided on an area corresponding to an area of the air flow path, wherein a width of opposite lower ends of an inlet part depressed at a position at which the air flow path is provided on the lower surface part of the seat pad is configured to be larger than a width of an inside of the air flow path, and a width of the through hole is configured to be larger than the width of the opposite lower ends of the inlet part.

2. The ventilation seat of claim 1, wherein the air flow path of the seat pad is configured to extend in a plurality of courses on the lower surface part of the seat pad, and the through hole of the adhesive material is configured by extending in order to correspond to a shape of the air flow path.

3. The ventilation seat of claim 1, wherein a width of the through hole is configured to be the same as a width of the air flow path.

4. The ventilation seat of claim 1, wherein an inlet part depressed at a position at which the air flow path is provided on the lower surface part of the seat pad includes joined parts protruding from opposite lower ends of the air flow path toward a center of the air flow path, wherein a distance spaced apart from each other between opposite lower ends of the joined parts is configured to be shorter than a width of an inside of the air flow path.

5. The ventilation seat of claim 4, wherein a width of the through hole is configured to be equal to or larger than the distance spaced apart from each other between the opposite lower ends of the joined parts.

6. The ventilation seat of claim 4, wherein each of joined parts is configured to constitute the same surface as the lower surface part of the seat pad.

7. The ventilation seat of claim 1, wherein the adhesive material is an acrylic pressure sensitive adhesive (PSA), a rubber PSA, or a hot melt PSA.

8. The ventilation seat of claim 1, wherein the channel cover includes a slit hole provided thereon through which a ventilation duct passes in order to be combined with the channel cover, wherein the slit hole is provided at a position at which the air flow path and the through hole overlap, and a diameter of the slit hole in a longitudinal direction of the seat is configured to be larger than a diameter of the slit hole in a width direction of the seat.

* * * * *